(12) United States Patent
Lee

(10) Patent No.: US 7,636,487 B2
(45) Date of Patent: Dec. 22, 2009

(54) DISPLAY DEVICE AND DRIVING DEVICE THEREOF

(75) Inventor: Seung-Woo Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 649 days.

(21) Appl. No.: 11/254,084

(22) Filed: Oct. 19, 2005

(65) Prior Publication Data

US 2006/0087696 A1 Apr. 27, 2006

(30) Foreign Application Priority Data

Oct. 22, 2004 (KR) .................. 10-2004-0084799

(51) Int. Cl.
*G06K 9/40* (2006.01)
(52) U.S. Cl. .................. 382/255; 382/274; 382/275; 382/278; 358/3.26; 358/3.27; 358/463
(58) Field of Classification Search .......... 382/255, 382/260, 274, 275, 278; 358/3.26, 3.27, 358/463
See application file for complete search history.

(56) References Cited

U.S. PATENT DOCUMENTS

| | | | | |
|---|---|---|---|---|
| 4,805,135 A * | 2/1989 | Ochi et al. | ................. | 358/1.15 |
| 5,796,931 A | 8/1998 | Sugiyama | | |
| 6,415,065 B1 * | 7/2002 | Miyake | ................. | 382/300 |
| 6,792,575 B1 * | 9/2004 | Samaniego et al. | ......... | 715/202 |
| 6,934,057 B1 * | 8/2005 | Namizuka | ................. | 358/2.1 |
| 6,964,009 B2 * | 11/2005 | Samaniego et al. | ......... | 715/202 |
| 7,245,398 B2 * | 7/2007 | Namizuka | ................. | 358/2.1 |
| 2003/0222839 A1 | 12/2003 | Lee | | |

FOREIGN PATENT DOCUMENTS

| | | |
|---|---|---|
| CN | 1477614 | 2/2004 |
| CN | 1535031 | 10/2004 |
| JP | 2004038693 | 2/2004 |

* cited by examiner

*Primary Examiner*—Yosef Kassa
(74) *Attorney, Agent, or Firm*—Cantor Colburn LLP

(57) ABSTRACT

A driving device comprises a look-up-table, a multiplier, an adder, and a dithering portion. The look-up-table stores red and blue colors of corrected image signals and first difference data (f) between input image signals and corrected image signals corresponding to the input image signals. The multiplier converts the input image signals into the same or higher bits of the input image signals. Further, the adder adds the higher bits of the input image signals to the first difference data. Finally, the dithering portion receives corrected image signals and generates output image signals suitable for a data drive portion. According to this configuration, the size of the look-up-table may be reduced and power consumption may be reduced.

14 Claims, 11 Drawing Sheets

: MSB 6bits ("0")

: MSB 6bits+1 ("1")

DISPLAY DEVICE AND DRIVING DEVICE THEREOF

This application relies for priority upon Korean Patent Application No. 2004-084799 filed on Oct. 22, 2004, the contents of which are herein incorporated by reference in its entirety.

BACKGROUND OF THE INVENTION

1. Field of the Invention

The present invention relates to display devices, and more particularly, to a display device having a reduced memory in size and a driving device thereof.

2. Description of the Related Art

Liquid crystal displays (LCDs), which are one type of display devices, comprise a liquid crystal panel having two opposing substrates (e.g. thin film transistor (TFT) and color filter (CF) substrates) and a liquid crystal layer disposed between the two opposing substrates. The LCDs display image data in response to movement of liquid crystal material caused by voltages applied from an external source.

The LCDs use the same electrical signal without considering unique optical characteristics of image signals (R, G, B), assuming that the optical characteristics of the image signals (R, G, B) are the same. In other words, according to the results of gamma measurement of each of the image signals (R, G, B), each of the image signals (R, G, B) has a unique gamma characteristic. The LCDs have some problems, such as a color shift, which causes an unwanted color, and non-uniform color temperature with respect to all gamma levels.

Therefore, the LCDs considering unique optical characteristics of each of the image signals (R, G, B) have been developed. For standardization and commercialization of the parts in the LCDs, an integrated controller for the LCDs has been also developed. The integrated controller for the LCDs can be used in any mode, such as TN, PVA, etc and can be designed to be programmable. The integrated controller comprises a look-up-table (LUT) required to perform data conversion so that each of unique optical characteristics of the image signals (R, G, B) are considered.

The integrated controller performs data conversion for input image signals. In other words, 8 bits of input image signals are converted into 10 bits and then 8 bits, 8 bits of the input image signals are converted into 9 bits and then 6 bits, and 6 bits of the input image signals are converted into 8 bits and then 6 bits, etc., for example. Accordingly, the integrated controller comprises various complicated parts and also requires a larger memory for performing various data conversion. These result in increasing power consumption of the integrated controller.

SUMMARY OF THE INVENTION

In exemplary embodiments, the present invention comprises a drive device including a look-up-table operable to store multiple corrected data corresponding to input image signals; and a dithering portion operable to receive the multiple corrected data from the look-up-table and to generate output image signals. Further, the drive device comprises a look-up-table operable to store desired bits of difference data between L bits of input image signals and multiple corrected data previously stored therein corresponding to the L bits of the input image signals; a multiplier operable to convert the L bits of the input image signals into M bits of the input image signals; an adder operable to add the desired bits of the difference data to the M bits of the input image signals to define M bits of corrected image signals; and a dithering portion operable to receive the M bits of corrected image signals and to generate N bits of output image signals.

In exemplary embodiments, the drive device comprises a look-up-table operable to store first difference data between L bits of input image signals and multiple corrected data previously stored therein corresponding to the L bits of the input image signals, and to store a difference between the adjacent the first difference data as parameters; and operable to receive desired MSB of the L bits of the input image signals; a multiplier operable to convert the L bits of the input image signals into M bits of the input image signals; an interpolator operable to receive the first difference data, the parameters, and LSB of the L bits of the input image signals except for the desired MSB of the L bits of the input image signals, and to generate second difference data with respect to the L bits of the input image signals; an adder operable to add the second difference data to the M bits of the input image signals; and a dithering portion operable to receive M bits of corrected image signals and to generate N bits of output image signals.

In exemplary embodiments, the drive device comprises a first look-up-table operable to store first difference data between L bits of input image signals and multiple corrected data previously stored therein corresponding to the L bits of the input image signals; a multiplier operable to convert the L bits of the input image signals into M bits of the input image signals; an adder operable to add the first difference data to M bits of ACC corrected image signals; a second look-up-table operable to store dithering patterns that temporally average the M bits of the ACC corrected image signals for a period of desired frames and spatially average the M bits of the ACC corrected image signals by a unit of desired pixels; and a dithering portion operable to generate N bits of output image signals according to the M bits of the corrected image signals and the dithering patterns from the second look-up-table.

These and other objects, features and advantages of the present invention will become apparent from the following detailed description of embodiments thereof, which is to be read in connection with the accompanying drawings.

BRIEF DESCRIPTION OF THE DRAWINGS

The above and other features and advantage points of the present invention will become more apparent by describing in detailed embodiments thereof with reference to the accompanying drawings, in which.

DETAILED DESCRIPTION OF THE INVENTION

Hereinafter the embodiments of the present invention will be described in detail with reference to the accompanied drawings.

Figure 1:
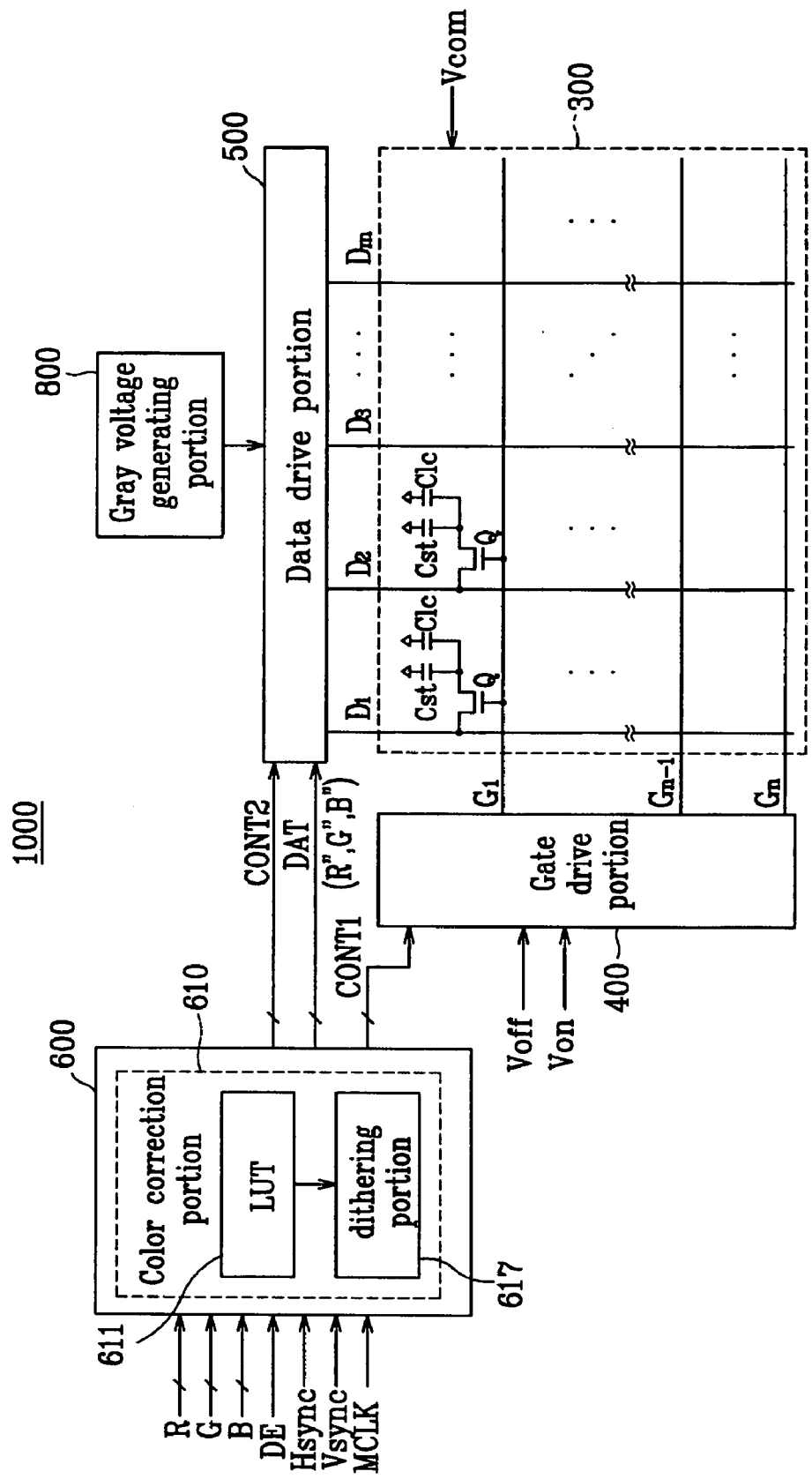
FIG. 1 is a block diagram of a liquid crystal display (LCD) device in accordance with exemplary embodiments.
Figure 2:
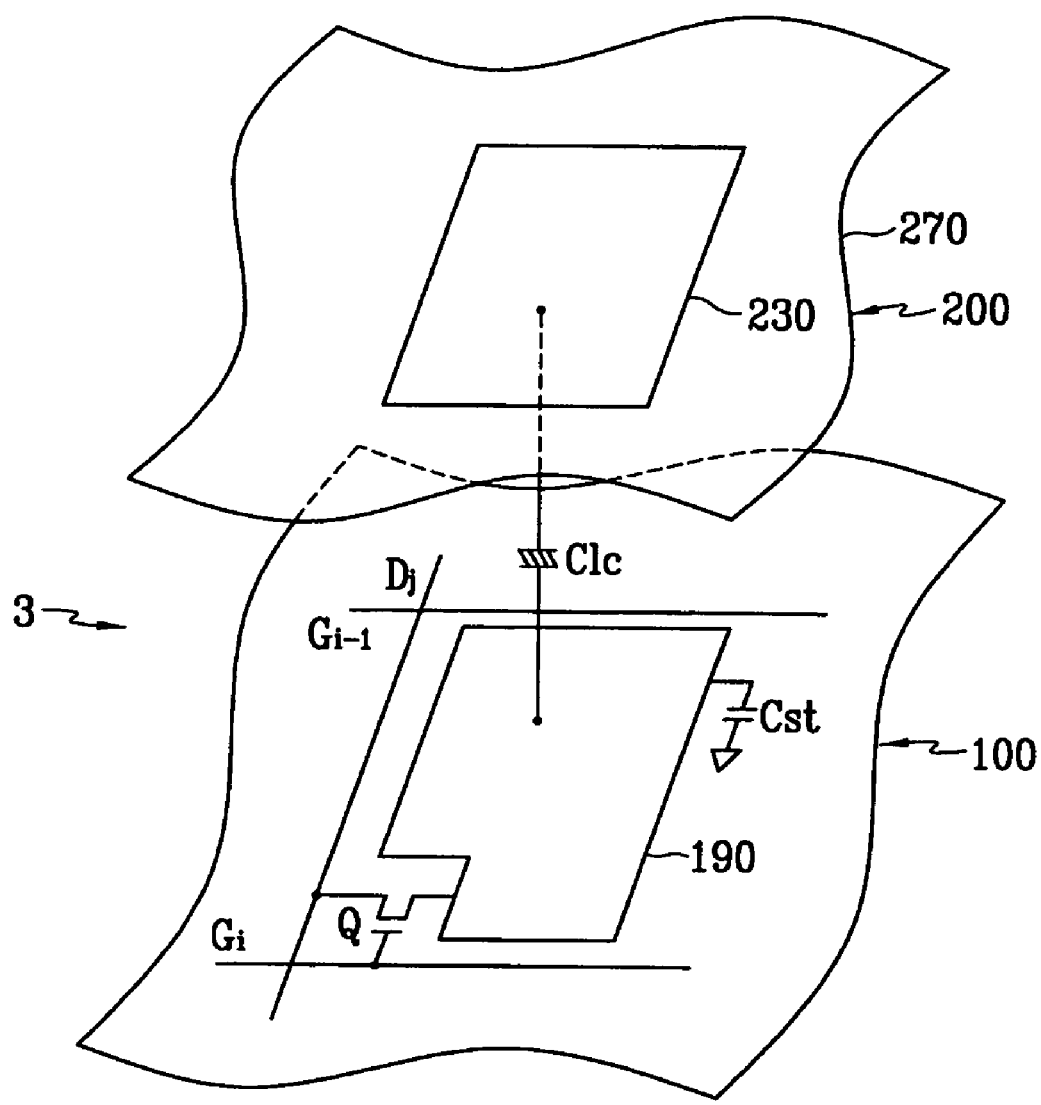
FIG. 2 is an equivalent circuit diagram for a pixel in the LCD device of FIG. 1 in accordance with exemplary embodiments.

FIG. 1 is a block diagram of a liquid crystal display (LCD) device in accordance with exemplary embodiments and FIG. 2 is an equivalent circuit diagram for a pixel in the LCD device of FIG. 1 in accordance with exemplary embodiments.

Turning to FIG. 1, an LCD device 1000 comprises a liquid crystal panel assembly 300, a gate drive portion 400, a data drive portion 500, a gamma voltage portion 800, and a signal control portion 600.

The liquid crystal panel assembly 300 comprises multiple display signals (e.g. gate lines $G_1$-$G_n$ and data lines $D_1$-$D_m$) arrayed in a matrix. The gate lines $G_1$-$G_n$ deliver gate signals and the data lines $D_1$-$D_m$ deliver data signals. As shown in FIG. 2, each pixel 2000 comprises a switching element Q connected to a gate line of the gate lines $G_1$-$G_n$ and a data line of data lines $D_1$-$D_m$, a liquid crystal capacitor $C_{LC}$, and optionally a storage capacitor $C_{st}$. The switching element Q is formed on a lower substrate 100 and has three terminals. The liquid crystal capacitor $C_{lc}$ represents a capacitor where a liquid crystal layer 3 is disposed between the pixel electrode 190 and a common electrode 270. The common electrode 270 is formed on an upper substrate 200. Further, the common electrode 270 may be formed on the lower substrate 100. The storage capacitor $C_{st}$ represents a capacitor where a separate signal line (not shown) formed on the lower substrate 100 overlaps the pixel electrode 190. Further, the storage capacitor $C_{st}$ may form a capacitor where the pixel electrode 190 overlaps a previous gate line.

The gamma voltage portion 800 includes two groups of gamma voltages, for example, one group has higher voltages and the other group has lower voltages than a common voltage. The number of groups of gamma voltages provided may be adjustable based on the resolution of the LCD device.

The gate drive portion 400 comprises a plurality of gate drivers (not shown) and applies a gate signal CONT1 to gate lines $G_1$-$G_n$ so as to turn on and off the switching elements Q. The gate drivers (not shown) having multiple integrated chips may be formed on the lower substrate 100 and may have a tape carrier package (TCP) type that each of the integrated chips is formed on each of flexible printed circuit (FPC) films.

The data drive portion 500 comprises a plurality of data drivers (not shown) and applies desired image signals to data lines $D_1$-$D_m$ by selecting a certain gamma voltage corresponding to the image signals from the gamma voltage portion 800. Further, the data drivers (not shown) having multiple integrated chips may be formed on the lower substrate 100 and may have TCP type that each of the integrated chips is formed on each of flexible printed circuit (FPC) films. The gate drivers and the data drivers may be formed on the lower substrate 100 with the same process as a TFT manufacturing process.

The signal control portion 600 comprises a color correction portion 610 and controls operation of the gate drive portion 400 and the data drive portion 500. Meanwhile, the color correction portion 610 may be formed outside of the signal control portion 600. The color correction portion 610 comprises a look-up-table (LUT) 611 and a dithering portion 617 and corrects the input image signals (R, G, B) received from an external graphic controller (not shown) so as to get a constant color temperature throughout entire gray levels in response to variation of the gray levels.

The LUT 611 stores n bits of corrected image signal corresponding to each of m bits of the input image signals (R, G, B). The LUT 611 receives the input image signals (R, G, B) and outputs the corresponding corrected image signals. A total capacity of the corrected image signal stored in the LUT 611 is 2m×n×3. The LUT 611 can be implemented by a read only memory (ROM) or a random access memory (RAM). Additionally, when the RAM (not shown) is used, the ROM (now shown) is outside of the color correction portion 611 and at an initial operation, the corrected image signals may be entered into the color correction portion 611 from the ROM.

The dithering portion 617 reads the corrected image signals from the LUT 611 and generates output image signals (R", G", B") to the data drive portion 500 after performing dithering. Herein, the dithering is to output m bits of the output image signals (R", G", B") corresponding to n bits of the input image signals (R, G, B) (herein, n is equal to or more than m) by temporally and spatially averaging the input image signals (R, G, B) for a period of frames (a frame is a period of displaying one screen at a time) of as many as $2^{(n-m)}$.

Operation of the LCD device 1000 will be now descried in accordance with exemplary embodiments.

Turning again to FIG. 1, the signal control portion 600 receives input control signals (Vsync, Hsync, Mclk, DE) from an external graphic controller (not shown) and input image signals (R, G, B) and generates output image signals (R", G", B"), gate control signals CONT1, and data control signals CONT2 in response to the input control signals and the input image signals (R, G, B). Further, the signal control portion 600 sends the gate control signals CONT1 to the gate drive portion 400 and the data control signals CONT2 to the data drive portion 500, respectively. The gate control signals CONT1 include STV indicating start of one frame, CPV controlling an output timing of the gate on signal, and OE indicating an ending time of one horizontal line, etc. The data control signals CONT2 include STH indicating start of one horizontal line, TP or LOAD instructing an output of data voltages, RVS or POL instructing polarity reverse of data voltages with respect to a common voltage, etc.

The data drive portion 500 receives the output image signals (R", G", B") from the signal control portion 600 and outputs the data voltages by selecting gamma voltages corresponding to the output image signals (R", G", B") according to the data control signals CONT2. The gate drive portion 400 applies the gate on signal to the gate lines according to the gate control signals CONT1 and turns on the switching elements Q connected to the gate lines.

Several methods of reducing the size of the LUT built in the color correction portion of the LCD device 1000 will be now described in accordance with exemplary embodiments.

The color correction is implemented with respect to the input image signal (R). The LUT 611 stores a corrected image signal of the input image signal (R) but does not require a corrected image signal of the input image signal (G). Accordingly, the size of the LUT 611 can be reduced by two-thirds of the conventional LUT.

Additionally, first difference data (f) between the corrected image signal of the input image signal (R) and the input image signal (R) are stored in the LUT 611 with respect to the entire gray levels of the input image signal (R). Accordingly, the size of the LUT 611 may be reduced by the number of bits representing the difference between the input image signal (R) and the corrected image signal.

Further, the LUT 611 stores corrected image signals corresponding to a desired range of the gray levels, not the entire gray levels of the input image signal (R), and thus the size of the LUT 611 may be more reduced.

Operation of a color correction portion 620 will be now described with reference to FIGS. 3 to 7.

The color correction portion 620 may comprise three groups of input-output patterns in accordance with the number of bits of the input image signals (R, G, B) and that of the output image signals (R", G", B"). For example, the three groups of input-output patterns comprise 'Input 8 bits-Output 8 bits', 'Input 8 bits-Output 6 bits', and 'Input 6 bits-Output 6 bits', but is not limited thereto.

Input 8 Bits-Output 8 Bits

The color correction portion 620 converts 8 bits of input image signal (R) into 10 bits of corrected image signal (R'); performs a dithering; and sends out 8 bits of corrected image signal (R").

For explanation, FIGS. 3 to 7 only show the input image signal (R), but the input image signal (B) may be also applied to the above. Herein, the input image signal (G) is sent to the data drive portion 500 without having to perform the above color correction.

Figure 3:
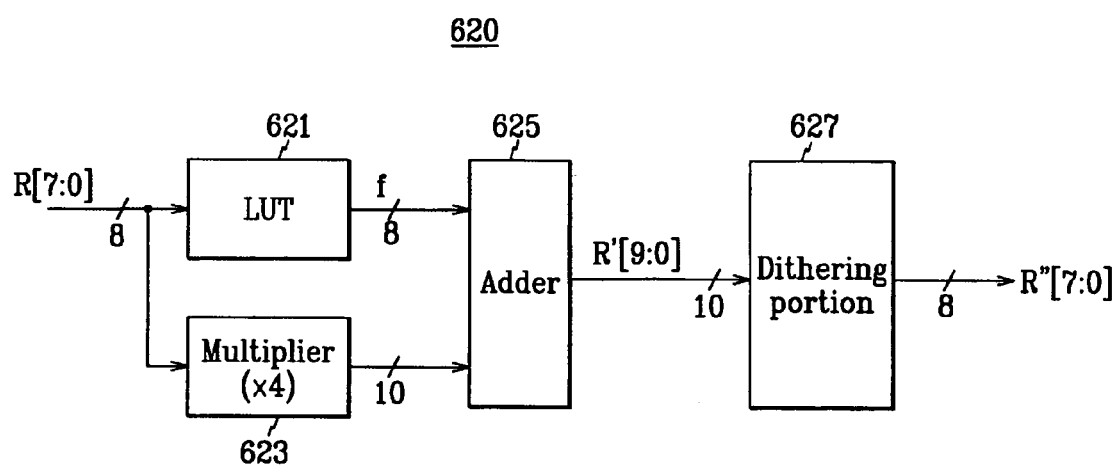
FIG. 3 is a block diagram of a color correction portion of the LCD device in accordance with exemplary embodiments.
Figure 4:
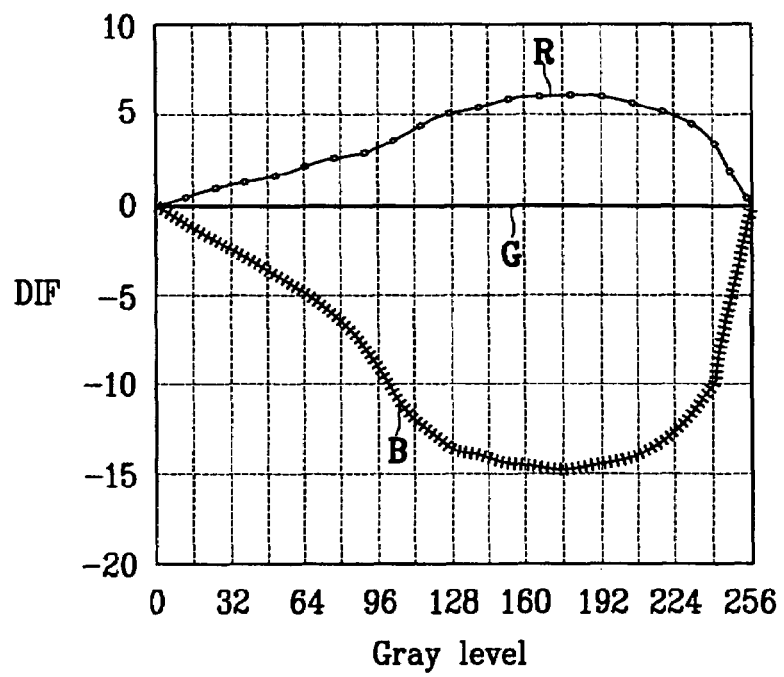
FIG. 4 is a graphical view showing the difference between ACC data and input image data.

Turning now to FIGS. 3 and 4, a color correction portion 620 comprises a look-up-table (LUT) 621, a multiplier 623, an adder 625, and a dithering portion 627. The LUT 621 stores first difference data (f) corresponding to difference (DIF) between the input image signal (R) and the corrected image signal of the input image signal (R), and sends out the first difference data (f). The multiplier 623 converts 8 bits of the input image signal (R) into 10 bits of the input image signal by multiplying the 8 bits of the input image signal (R) by 4 (a binary "100"). The adder 625 adds the 10 bits of the input image signal to the first difference data (f); generates 10 bits of corrected image signal (R'); and sends the 10 bits of the corrected image signal (R') to the dithering portion 627. The dithering portion 627 receives the corrected image signal (R'); performs a dithering; and sends out 8 bits of output image signal (R").

The first difference data (f) is 8 bits of data with MSB 1 bit representing a sign bit; with LSB 2 bits representing a resolution of the LCD device 1000; and with remaining 5 bits representing values of the difference (DIF). As shown in FIG. 4, the values of the difference (DIF) are less than +/−16 and may be represented by 5 bits. In exemplary embodiments, the size of the LUT 621 may be reduced by 20% compared to that of the LUT 611. Additionally, if the values may be represented by 4 bits, the size of the LUT 621 may be reduced by 30% compared to that of the LUT 611. If the resolution of the LCD device 1000 may be also represented by 1 bit, the size of the LUT 621 may be reduced by at least 40% compared to the LUT 611. In exemplary embodiments, the total capacity of the LUT 611 comes to 256×10×3=7,680 bits, but If corrected image signal of an input image signal (G) is eliminated, the total capacity of the LUT 621 comes to 256×10×2=5,120 bits and if the 8 bits of first difference data (f) are only stored in the LUT 621, the total capacity of the LUT 621 comes to 256×8×2=4,096 bits.

Figure 5:
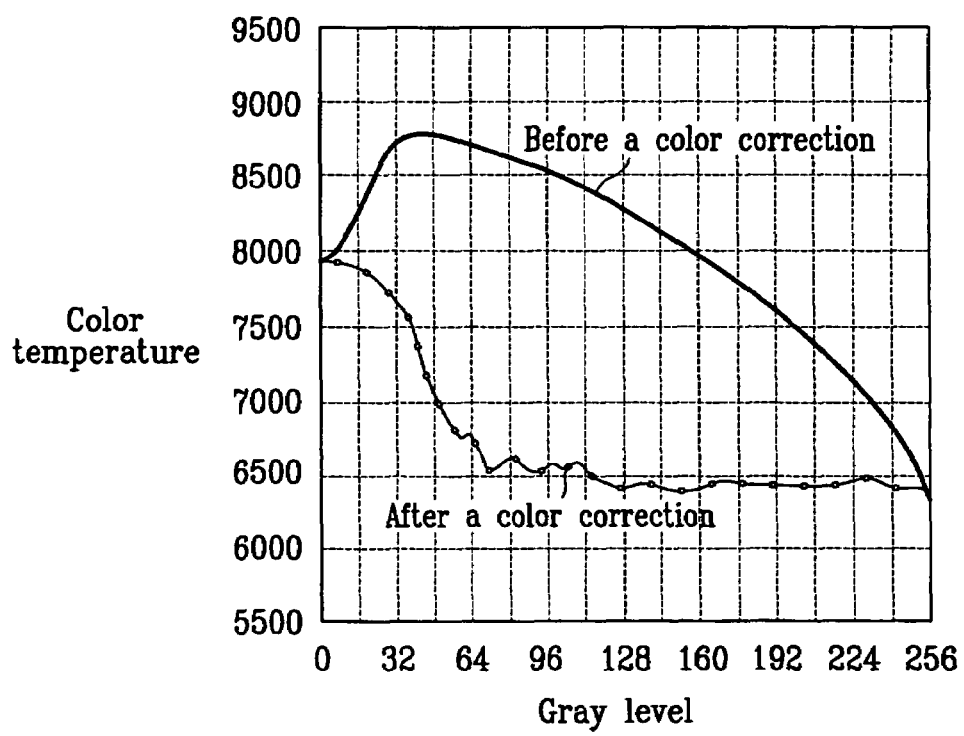
FIG. 5 is a graphical view showing color temperature curves before and after a color correction in accordance with exemplary embodiments.

Turning to FIG. 5, color temperature distribution throughout all gray levels represents a difference between before a color correction and after a color correction. In other words, the color temperature distribution after a color correction shows substantially uniform distribution from more than 64 gray level, but the color temperature distribution before a color correction shows linear characteristics throughout all gray levels. As a result, this may prevent undesired images from being displayed.

Operation of the color correction portion 630 using an interpolation will be now described with reference to FIGS. 6 and 7.

Figure 6:
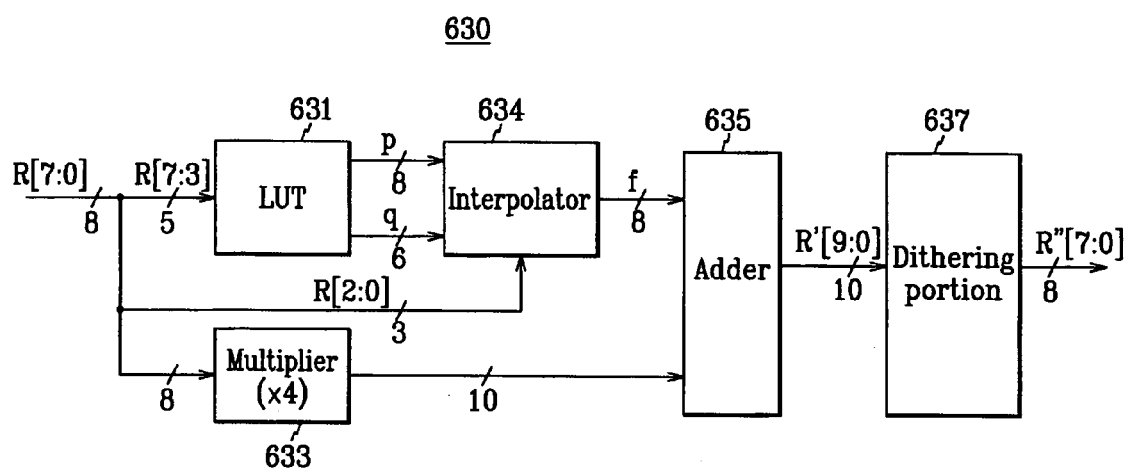
FIG. 6 is a block diagram of a color correction portion of the LCD device in accordance with exemplary embodiments.

Turning now to FIG. 6, the color correction portion 630 comprises a look-up-table (LUT) 631, a multiplier 633, an interpolator 634, an adder 635, and a dithering portion 637. The multiplier 633, the adder 635, and the dithering portion 637 are in substantially the same configuration as those of the color correction portion 620 and their explanation will be omitted to avoid description duplication.

The LUT 631 stores second difference data (p) in response to a difference (DIF) between the input image signal (R) and the corrected image signal of the input image signal (R) by a unit of 8 gray levels, and stores difference between the adjacent second difference data (p) as parameters (q). The LUT 631 receives MSB 5 bits of the input image signal (R) and sends to the interpolator 634 the second difference data (p) and the parameters (q) in response to the MSB 5 bits of the input image signal (R).

The interpolator 634 receives LSB 3 bits of the input image signal (R), the second different data (p), and the parameter (q); interpolates third difference data (f) with respect to the input image signal (R); and sends the third difference data (f) to the adder 635.

Figure 7:
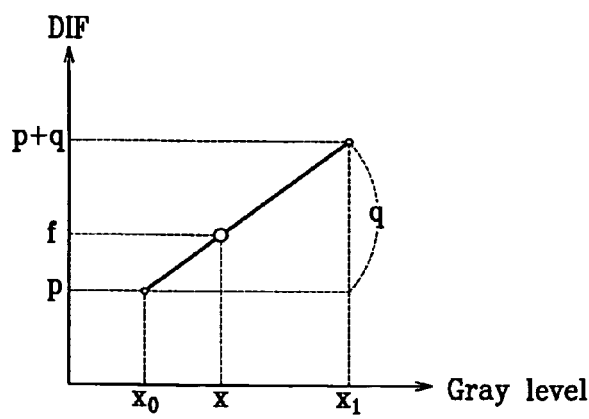
FIG. 7 is a graphical view showing a part of FIG. 4 for applying for a linear interpolation method in accordance with embodiments.

Turning now to FIG. 7, if the input image signal (R) refers to x, the third difference data (f) with respect to the x may be obtained by a following equation using a linear interpolation.

$$(x1-x0):(x-x0)=q:(f-p)$$

$$f=p+q(x-x0)/(x1-x0) \qquad \text{Equation 1}$$

Herein, (x1−x0) equals 8 being a desired range of the gray levels and (x−x0) corresponding to the LSB 3 bits of the input image signal (R).

The second difference data (p) is 8 bits of data with MSB 1 bit representing a sign bit; with LSB 2 bits representing a resolution (0.25) of the LCD device 1000; and with remaining 5 bits representing the difference (DIF). Accordingly, since the LUT 631 stores 8 bits of the second difference data (p) and 6 bits of the parameters (q) by a unit of 8 gray levels, the total capacity of the LUT 631 comes to 32×14×2=896 bits. In other words, the size of the LUT 631 may be reduced by 12% compared to that of the LUT 611.

Input 8 Bits-Output 6 Bits

Figure 8:
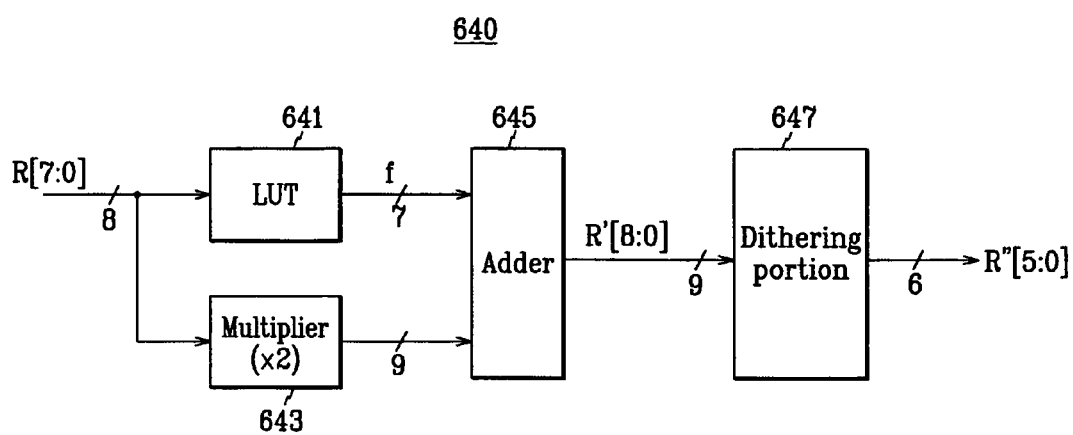
FIGS. 8 to 11 are a block diagram of the color correction portion of the LCD device in accordance with exemplary embodiments.

Operation of the color correction portion 640 will be now descried in detail with reference to FIG. 8. The color correction portion 640 converts 8 bits of input image signal (R) into 9 bits of a corrected image signal (R'); performs a dithering; and sends out 6 bits of an output image signal (R").

For explanation, FIG. 8 only shows the input image signal (R), but the input image signal (B) may be also applied to the above. The input image signal (G) is sent to the data drive portion 500 without having to perform the above color correction.

Turning now to FIG. 8, a color correction portion 640 comprises a look-up-table (LUT) 641, a multiplier 643, an adder 645, and a dithering portion 647. The LUT 641 stores third difference data (f) with respect to a difference (DIF) between the input image signal (R) and the corrected image signal of the input image signal (R), and sends out the third difference data (f). The multiplier 643 converts 8 bits of the input image signal (R) into 9 bits of an input image signal by multiplying the 8 bits of the input image signal (R) by 2 (a binary "10"). The adder 645 adds the third difference data (f)

to the 9 bits of the input image signal; generates 9 bits of a corrected image signal (R'); and sends the 9 bits of the corrected image signal (R') to the dithering portion 647. The dithering portion 647 receives the corrected image signal (R'); performs a dithering; and sends out 6 bits of an output image signal (R").

The third difference data (f) is 7 bits of data with MSB 1 bit representing a sign bit; with LSB 1 bit representing the resolution (0.5) of the LCD device 1000; and with remaining 5 bits representing the difference (DIF). In exemplary embodiments, if the third difference data (f) are only stored in the LUT 641, the total capacity of the LUT 641 comes to 256× 7×2=3,584 bits and may be reduced by 52% compared to that of the LUT 611. Additionally, if the third difference data (f) may be represented by 4 bits, the total capacity of the LUT 641 comes to 256×6×2=3,072 bits and the size of the LUT 641 may be reduced by 44% compared to that of the LUT 611.

Operation of the color correction portion 650 using an interpolation will be now described with reference to FIG. 9.

Figure 9:
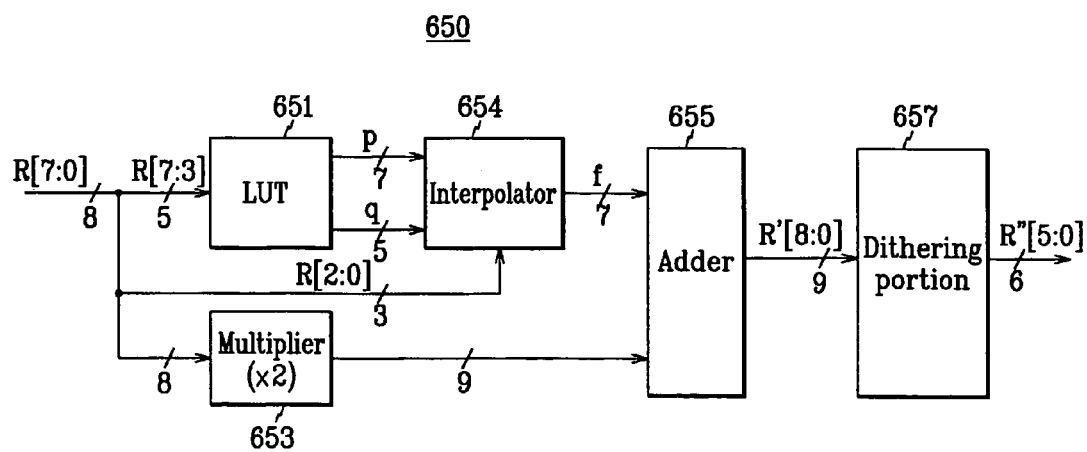

For explanation, FIG. 9 only shows the input image signal (R), but the input image signal (B) may be also applied to the above color correction.

Turning to FIG. 9, the color correction portion 650 comprises a look-up-table (LUT) 651, a multiplier 653, an interpolator 654, an adder 655, and a dithering portion 657. The multiplier 653, the adder 655, and the dithering portion 657 are in substantially the same configuration as those of the color correction portion 640 and their explanation will be omitted to avoid description duplication.

The LUT 651 stores second difference data (p) in response to a difference (DIF) between the input image signal (R) and a corrected image signal of the input image signal (R) by a unit of 8 gray levels, and stores a difference between the adjacent second difference data (p) as parameters (q). The LUT 651 receives MSB 5 bits of the input image signal (R) and sends the second difference data (p) and the parameters (q) in response to the MSB 5 bits of the input image signal (R) to the interpolator 654.

The interpolator 654 receives LSB 3 bits of the input image signal (R), the second difference data (p), and the parameters (q); interpolates third difference data (f) with respect to the input image signal (R); and sends the third difference data (f) to the adder 655.

The second difference data (p) is 7 bits of data with MSB 1 bit representing a sign bit; with LSB 1 bit representing a resolution (0.5) of the LCD device 1000; and with remaining 5 bits representing the difference (DIF). The parameters (q) are 5 bits of data with MSB 1 bit representing a sign bit; with LSB 1 bit representing a resolution (0.5) of the LCD device 1000; and with remaining 3 bits representing a difference between the adjacent second difference data (p). Accordingly, since the LUT 651 stores 7 bits of the second difference data (p) and 5 bits of the parameters (q) by a unit of 8 gray levels, the total capacity of the LUT 651 comes to 32×12×2=768 bits. Additionally, if the number of bits of the difference (DIF) may be reduced by 1 bit, the second difference data (p) and the parameters (q) become 4 bits of data and thus the total capacity of the LUT 651 comes to 32×10×2=640 bits.

Input 6 Bits-Output 6 Bits

Figure 10:
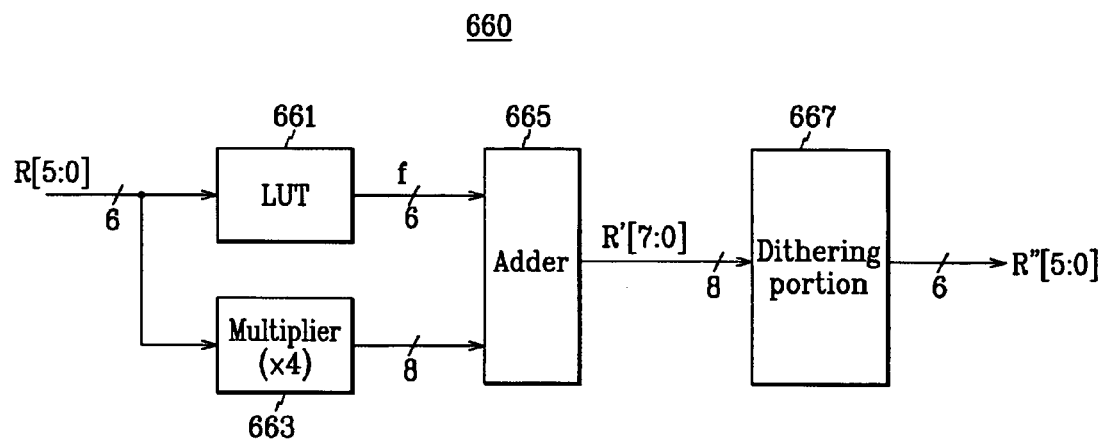

Operation of the color correction portion 660 will be now descried in detail with reference to FIG. 10. The color correction portion 660 receives 6 bits of input image signal (R); performs a dithering; and sends out 6 bits of an output image signal (R").

For explanation, FIG. 10 only shows the input image signal (R), but the input image signal (B) may be also applied to the above. The input image signal (G) is sent to the data drive portion 500 without having to perform the above color correction.

Turning to FIG. 10, a color correction portion 660 comprises a look-up-table (LUT) 661, a multiplier 663, an adder 665, and a dithering portion 667. The LUT 661 stores third difference data (f) in response to a difference (DIF) between the input image signal (R) and the corrected image signal of the input image signal (R), and sends out the third difference data (f). The multiplier 663 converts 6 bits of the input image signal (R) into 8 bits of the input image signal (R) by multiplying the 6 bits of the input image signal (R) by 4 (a binary "100"). The adder 665 adds the third difference data (f) to the 6 bits of the input image signal (R); generates 8 bits of a corrected image signal (R'); and sends the 8 bits of the corrected image signal (R') to the dithering portion 667. The dithering portion 667 receives the 8 bits of the corrected image signal (R'); performs a dithering; and sends out 6 bits of an output image signal (R").

The third difference data (f) is 6 bits of data with MSB 1 bit representing a sign bit; with LSB 2 bits representing a resolution (0.25) of the LCD device 1000; and with remaining 3 bits representing the difference (DIF). Herein, FIG. 4 shows the difference (DIF) between the input image signal (R) and the corrected image signal of the input image signal (R) with respect to 256 gray levels, but may be also applied to 64 gray levels by scaling down by ¼. For example, values of the difference (DIF) are less than +/−4 and may be represented by 3 bits. In exemplary embodiments, if the third difference data (f) are only stored in the LUT 661, the total capacity of the LUT 661 comes to 64×6×2=768 bits and may be reduced by 50% compared to that of the LUT 611.

Operation of the color correction portion 670 using an interpolation will be now described with reference to FIG. 11.

Figure 11:
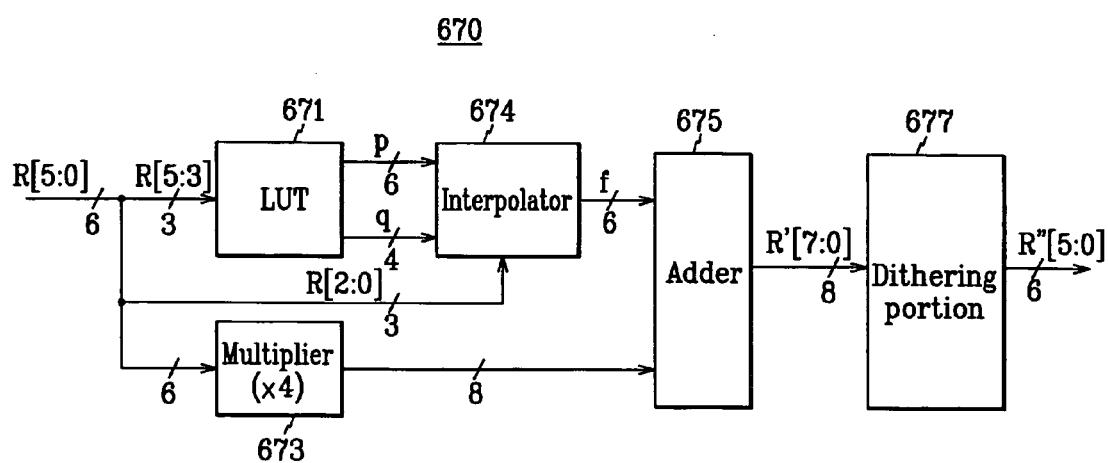

For explanation, FIG. 11 only shows the input image signal (R), but the input image signal (B) may be also applied to the above color correction.

Turning to FIG. 11, the color correction portion 670 comprises a look-up-table (LUT) 671, a multiplier 673, an interpolator 674, an adder 675, and a dithering portion 677. The multiplier 673, the adder 675, and the dithering portion 677 are in substantially the same configuration as those of the color correction portion 660 and their explanation will be omitted to avoid description duplication.

The LUT 671 stores second difference data (p) in response to a difference (DIF) between the input image signal (R) and a corrected image signal of the input image signal (R) by a unit of 8 gray levels, and stores the difference between the adjacent second difference data (p) as parameters (q). The LUT 671 receives MSB 3 bits of the input image signal (R) and sends the second difference data (p) and the parameters (q) in response to the MSB 3 bits of the input image signal (R) to the interpolator 674.

The interpolator 674 receives LSB 3 bits of the input image signal (R), the second difference data (p), and the parameters (q); interpolates third difference data (f) with respect to the input image signal (R); and sends the third difference data (f) to the adder 675.

The second difference data (p) are 6 bits of data with MSB 1 bit representing a sign bit; with LSB 2 bits representing a resolution (0.25) of the LCD device 1000; and with remaining 3 bits representing the difference (DIF). The parameters (q) are 4 bits of data with MSB 1 bit representing a sign bit; with LSB 2 bits representing a resolution (0.25) of the LCD device 1000; and with remaining 1 bit representing difference between the adjacent second difference data (p). Accordingly, since the LUT 671 stores 6 bits of the second difference data (p) and 4 bits of the parameters (q) by a unit of 8 gray levels, the total capacity of the LUT 671 comes to 8×10×2=160 bits. In exemplary embodiments, the LUTs 611 to 671 as described the above may be implemented by ROM or RAM, and if RAM is used, the second difference data (p) may be extracted from ROM at an initial operation of the LCD device 1000. Additionally, if an interpolation is used, ROM may store only the second difference data (p). The parameters (q) are calculated in response to the second difference data (p) at an initial operation of the LCD device 1000 and are stored in the RAM. According to this configuration, the size of the ROM may be reduced.

Logic integration of the input 8 bits-output 6 bits of the color correction portion and the input 6 bits-output 6 bits of the color correction portion will be now described with reference to the accompanying drawings.

First of all, input 8 bits-corrected 9 bits of the input 8 bits-output 6 bits will be described with reference to FIGS. 9 and 12*a*.

Figure 12A:
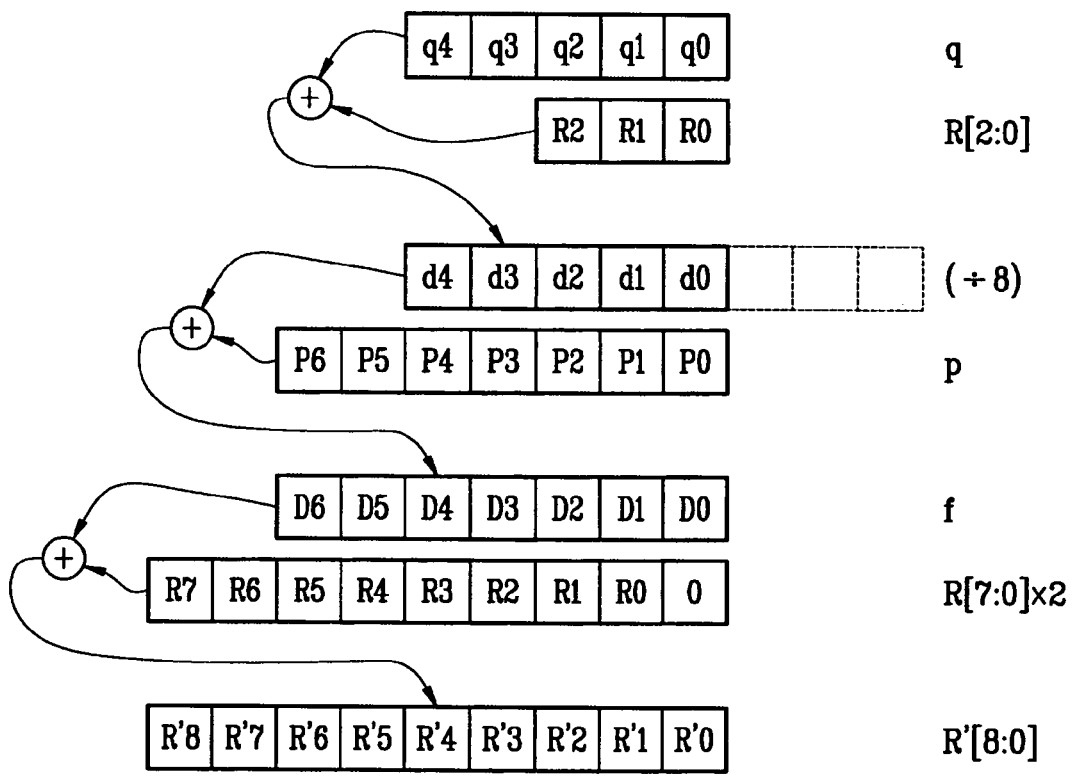
FIGS. 12a and 12b are graphical views showing calculation in the color correction portion of the LCD device in accordance with exemplary embodiments.

Turning now to FIGS. 9 and 12*a*, the interpolator 654 extracts 5 bits of the parameters (q) corresponding to the input image signal (R) from the LUT 651, and multiplies the parameters (q) by LSB 3 bits (R [2:0]) of the input image signal (R). 7 bits of the third difference data (f) with respect to the input image signal (R) are generated by dividing the multiplied data by 8 and adding 7 bits of the second difference data (p). The adder 655 adds the third difference data (f) to the input image signal (R) multiplied by 2 and extracts the 9 bits of the corrected image signal (R').

Meanwhile, input 6 bits-corrected 8 bits of the input 6 bits-output 6 bits will be now described with reference to FIGS. 11 and 12*b*.

Figure 12B:
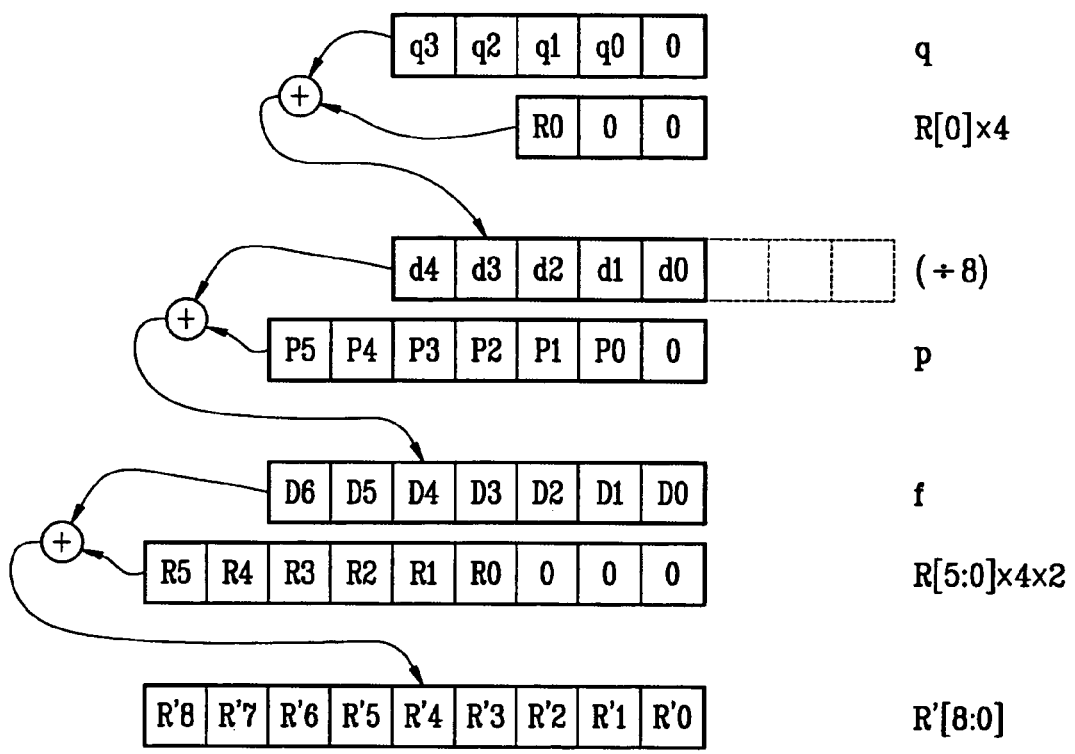

Turning now to FIGS. 11 and 12*b*, the input 6 bits-corrected 8 bits may be implemented by the same interpolation as the input 8 bits-corrected 9 bits except that the interpolation of the input 6 bits-corrected 8 bits is performed by a unit of 2 gray levels. 6 bits of the input image signal (R) are multiplied by 4. In other words, the 6 bits of the input image signal (R) are converted into 8 bits of the input image signal (R) by inserting "00" into LSB 2 bits of the input image signal (R). However, the LUT 671 may use the LUT 651 which has a total capacity of 32×12×2 bits. Additionally, the LSB 1 bit of the second difference data (p) and the parameters (q) are involved in the above calculation, but may be ignored.

Turning now to FIG. 12*b*, since the calculation is the same as that of FIG. 12*a*, its explanation will be omitted to avoid description duplication. In exemplary embodiments, 8 bits of data except for LSB (R'0) of the calculated data (R'[8:0]) becomes the corrected image signal (R'). FIGS. 12*a* and 12*b* only show the input image signal (R), but the input image signal (B) may be also applied to the above.

9 bits-6 bits dithering of the input 8 bits-output 6 bits and 8 bits-6 bits dithering of the input 6 bits-output 6 bits will be now described with reference to FIGS. 13 and 14.

Figure 13:
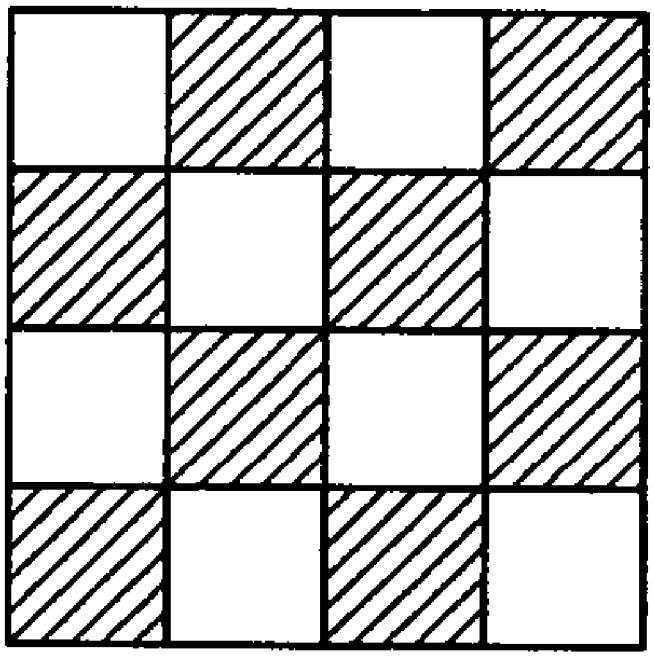
FIGS. 13 and 14 are a graphical view showing dithering patterns of the color correction portion of the LCD device in accordance with exemplary embodiments.
Figure 13:
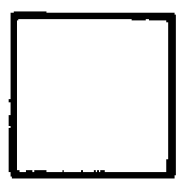
Figure 13:
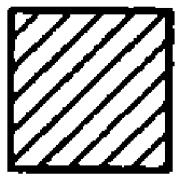

Turning now to FIG. 13, the 9 bits-6 bits dithering converts the 9 bits of the corrected image signal (R') into 6 bits of an output image signal (R") and the 8 bits-6 bits dithering converts 8 bits of the corrected image signal (R') into 6 bits of an output image signal (R"). The 9 bits of the corrected image signal (R') are converted into the 6 bits of the output image signal (R") by temporally averaging the 9 bits of the corrected image signal (R') for a period of 8 frames (i.e. a period of time corresponding to LSB 3 bits of the 9 bits of the corrected image signal), and by spatially averaging the 9 bits of the corrected image signal (R') by a unit of 16 pixels. Meanwhile, the 8 bits of the corrected image signal (R') are converted into the 6 bits of the output image signal (R") by temporally averaging the 8 bits of the input image signal (R) for a period of 4 frames (i.e. a period of time corresponding to LSB 2 bits of the 8 bits of the corrected image signal), and by spatially averaging the 8 bits of the corrected image signal (R') by a unit of 8 pixels.

Turning now to FIG. 13, dithering patterns are used to spatially average 4×4 pixels (a unit of 16 pixels) with respect to LSB 3 bits, "100," of the 9 bits of the corrected image signal (R'). Herein, a shaded area ("1") represents output image data that add a decimal of 1 to MSB 6 bits of the 9 bits of the corrected image signal (R') and a blank area ("0") represents MSB 6 bits of the 9 bits of the corrected image signal (R'). FIG. 14 shows dithering patterns that temporally average desired image signals for a period of 8 frames considering poor influence, such as flicker, etc, on a unit of 16 pixels.

According to this configuration, an integrated logic circuit (not shown) may be made by integrating logic of the 8 bits-6 bits dithering into logic of the 9 bits-6 bits dithering. In other words, the integrated logic circuit is configured by corresponding dithering patterns of LSB 2 bits, "00/01/10/11" of the 8 bits of the corrected image signal (R') with respect to dithering patterns of LSB 3 bits, "000/010/100/110" of the 9 bits of the corrected image signal (R'). Turning back to FIG. 12*b*, this configuration may be implemented by adding "0" to LSB (R'0) of the final image data (R'[8:0]).

In exemplary embodiments, each of the color correction portions 610 to 670 comprises a look-up-table storing the dithering patterns. Accordingly, the dithering patterns may be variable by changing values in the LUT as required. Herein, the total capacity of the LUT for the dithering patterns comes to 16×7×8=896 bits, but may be reduced considering regularity of the dithering patterns.

Figure 14:
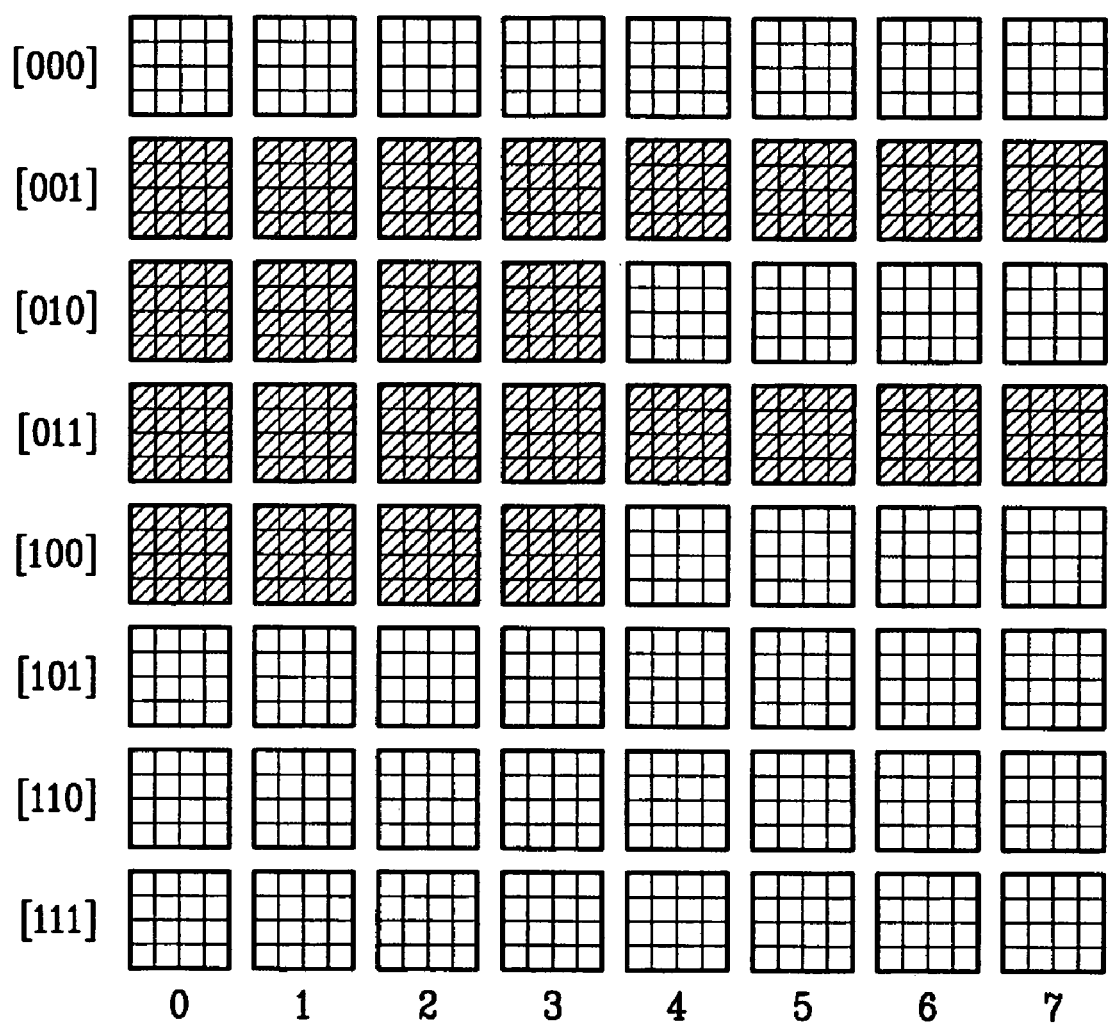

Turning now to FIG. 14, any one of a pair of patterns related with an inversion in the dithering patterns may be eliminated. For example, since LSB 3 bits, "001," "010," and "011" of the dithering patterns each have an inversion relation with LSB 3 bits, "111," "101," and "110" of the dithering patterns, only one of the pair of patterns is stored in the LUT for the dithering patterns. As a result, the total capacity of the LUT comes to 16×4×8=512 bits and thus may be more reduced. Further, in case of LSB "0," since the dithering patterns may be repeated by a unit of 4 frames, the LUT stores the dithering patterns for a period of 4 frames. Accordingly, the total capacity of the LUT comes to 16×3×8=384 bits. In exemplary embodiments, the logic of the 9 bits-6 bits dithering may be implemented only if the LUT stores the shaded area of the dithering patterns.

According to this configuration, the color correction portion 660 shown in FIG. 10 may be integrated into the color correction portion 650 shown in FIG. 9. The color correction portion 650 may further comprise a bit converting portion that converts 6 bits of the input image signals into 8 bits of the image signals by multiplying the 6 bits of the input image signals by 4.

Meanwhile, the LUTs for the corrected image signal and the LUT for the dithering patterns as described above may be implemented by substantially the same type of memory. Herein, the LUT for the corrected image signal stores the parameters (q). In alternative embodiments, the parameters (q) are not stored, but derived by extracting two second difference data (p) from the LUT for the corrected image signal and then calculating difference of the two second difference data (p). As a result, the size of the LUT for the corrected image signal may be reduced.

In exemplary embodiments, the LCD device 1000 is described, but the invention is not limited thereto. The present invention may be applied to other types of display devices, such as a plasma display panel display (PDP), an organic light emitting display (OLED), etc.

The size of the LUT for the corrected image signal may be reduced by storing the second difference data (p) and using interpolation, and thus power consumption may be reduced. Further, the dithering patterns may be variable by storing the dithering patterns in the LUT and the size of the LUT for the dithering patterns may be minimized considering regularity of the dithering patterns. Additionally, the integrated logic of the 6 bits-8 bits is integrated into that of the 8 bits-9 bits and the integrated logic of the 8 bits-6 bits is integrated into that of the 9 bits-6 bits, and thus the LUT for the corrected image signal and the logic for the corrected image signal may be used in common.

Having described the embodiments of the present invention and its advantages, it should be noted that various changes, substitutions and alterations can be made herein without departing from the spirit and scope of the invention as defined by appended claims.

What is claimed is:

1. A driving device for a display device, comprising:
a look-up-table operable to store desired bits of difference data between L bits of input image signals and multiple corrected data corresponding to the L bits of the input image signals;
a multiplier operable to convert the L bits of the input image signals into M bits of the input image signals;
an adder operable to add the desired bits of the difference data to the M bits of the input image signals to define M bits of corrected image signals; and
a dithering portion operable to receive the M bits of corrected image signals and to generate N bits of output image signals.

2. The driving device of the display device of claim 1, wherein the L bits of the input image signals comprise red and blue colors of the input image signals.

3. The driving device for the display device of claim 2, wherein the look-up-table comprises the desired bits of the difference data being 8 bits of data with MSB 1 bit representing a sign bit; with LSB 2 bits representing a resolution; and with remaining 5 bits representing the difference values.

4. The driving device for the display device of claim 2, wherein the look-up-table comprises the desired bits of the difference data being 7 bits of data with MSB 1 bit representing a sign bit; with LSB 1 bit representing a resolution; and with remaining 5 bits representing the difference values.

5. The driving device for the display device of claim 2, wherein the look-up-table comprises the desired bits of the difference data being 6 bits of data with MSB 1 bit representing a sign bit; with LSB 2 bits representing a resolution; and with remaining 3 bits representing the difference values.

6. The driving device of the display device of claim 2, wherein the look-up-table comprises ROM or RAM.

7. The driving device for the display device of claim 2, wherein the multiplier converts the L bits of the input image signals into the M bits of the input image signals by multiplying the L bits of the input image signals by $2^{(M-L)}$.

8. A display device, comprising:
a signal control portion operable to receive input image signals and control signals and to generate gate and data control signals, the signal control portion including a driving device that generates output image signals in response to the input image signals as recited in claim 1;
a data drive portion operable to receive the input image signals and the data control signals and to convert the input image signals into image data voltages according to the data control signals;
a gate drive portion operable to generate gate output signals for turning on or turning off switching elements according to the gate control signals, and
a flat panel having data lines, gate lines, the switching elements, and pixel circuits on an insulating substrate.

9. A driving device for a display device, comprising:
a first look-up-table operable to store first difference data between L bits of input image signals and multiple corrected data corresponding to the L bits of the input image signals;
a multiplier operable to convert the L bits of the input image signals into M bits of the input image signals;
an adder operable to add the first difference data to M bits of ACC corrected image signals;
a second look-up-table operable to store dithering patterns that temporally average the M bits of the ACC corrected image signals for a period of desired frames and spatially average the M bits of the ACC corrected image signals by a unit of desired pixels; and
a dithering portion operable to generate N bits of output image signals according to the M bits of the corrected image signals and the dithering patterns from the second look-up-table.

10. The driving device of the display device of claim 9, wherein the desired frames are 8 and the desired pixels are 16 if L=9 and N=6 or L=8 and N=6.

11. The driving device of the display device of claim 10, wherein dithering patterns of LSB 2 bits, "01," "10," and "11" when L=8 and N=6 correspond to dithering patterns of LSB 3 bits, "010," "100," and "110" when L=9 and N=6.

12. The driving device of the display device of claim 9, wherein the second look-up-table stores either one of a pair of dithering patterns related with an inversion.

13. The driving device of the display device of claim 12, wherein the second look-up-table stores dithering patterns that temporally average the M bits of the ACC corrected image signal for a period of half of the desired frame if LSB 1 bit in the dithering patterns is "0."

14. A display device, comprising:
a signal control portion operable to receive input image signals and control signals and to generate gate and data control signals, the signal control portion including a driving device that generates output image signals in response to the input image signals as recited in claim 9;
a data drive portion operable to receive the input image signals and the data control signals and to convert the input image signals into image data voltages according to the data control signals;
a gate drive portion operable to generate gate output signals for turning on or turning off switching elements according to the gate control signals, and
a flat panel having data lines, gate lines, the switching elements, and pixel circuits on an insulating substrate.

* * * * *

UNITED STATES PATENT AND TRADEMARK OFFICE
CERTIFICATE OF CORRECTION

PATENT NO.       : 7,636,487 B2                                      Page 1 of 1
APPLICATION NO. : 11/254084
DATED            : December 22, 2009
INVENTOR(S)      : Seung-Woo Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this

Twenty-first Day of December, 2010

David J. Kappos
*Director of the United States Patent and Trademark Office*